Figure 1:
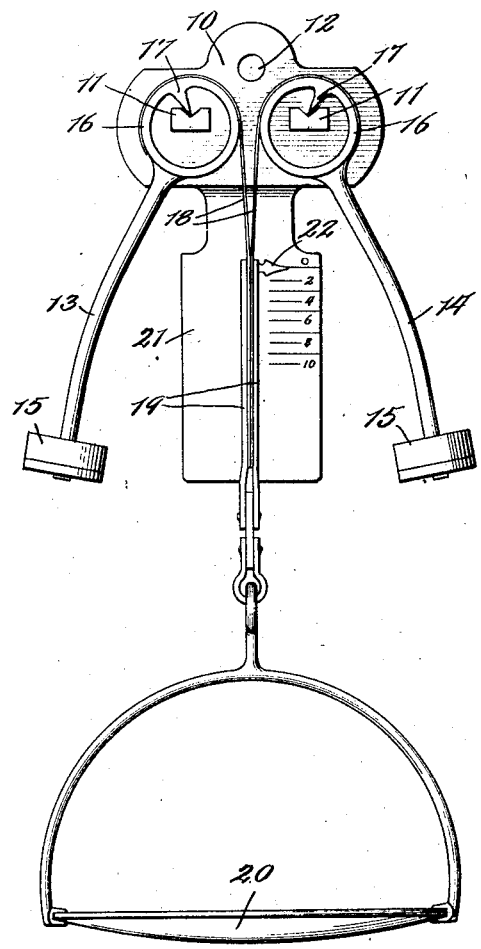

T. C. PROUTY.
WEIGHING SCALE.
APPLICATION FILED FEB. 17, 1909.

1,009,094.

Patented Nov. 21, 1911.

Witnesses:

Inventor:
Theodore C. Prouty.
By Bond, Adams, Pickard & Jackson
his Attys.

UNITED STATES PATENT OFFICE.

THEODORE C. PROUTY, OF AURORA, ILLINOIS.

WEIGHING-SCALE.

1,009,094.  Specification of Letters Patent.  Patented Nov. 21, 1911.

Application filed February 17, 1909. Serial No. 478,468.

*To all whom it may concern:*

Be it known that I, THEODORE C. PROUTY, a citizen of the United States, residing at Aurora, in the county of Kane and State of Illinois, have invented certain new and useful Improvements in Weighing-Scales, of which the following is a specification, reference being had to the accompanying drawings.

This invention relates to weighing scales, and has for its object to provide a new and improved form of scale employing a pivoted counterbalance lever for supporting the platform or pan and attached parts.

More particularly the object of my invention is to provide a new and improved construction of such scale which shall do away with the necessity for maintaining the scale constantly in any particular position, by which improved construction accurate results can be obtained even though the scale is tipped slightly one way or another from the normal position. I accomplish this object by the means shown in the drawings and hereinafter specifically described.

That which I believe to be new will be set forth in the claims.

Figure 2:
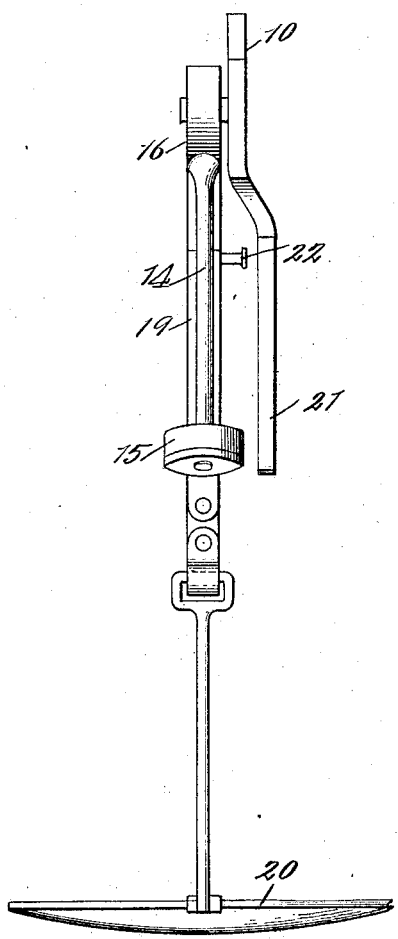

In the accompanying drawings:—Figure 1 is a front elevation of my improved construction as applied to a scale adapted to be suspended. Fig. 2 is a side elevation of the same.

Referring to the drawings, 10 indicates a crossbar provided with two horizontally-projecting grooved blocks 11 secured to its front face, said crossbar being provided with a hole 12 midway between the grooves in said blocks for the purpose of suspending the device.

13—14 indicates counterbalancing arms or levers, bearing at their lower ends weights 15 and provided at their upper ends with rings 16, from the upper portions of the inner peripheries of which rings depend blades 17 adapted to rest in the grooves of the blocks 11, this construction forming a pivotal support for said arms.

Near the points where the arms 13—14 are attached to said rings 16 there are attached to the upper surfaces of said rings two flexible bands 18, one band being attached to each ring, said bands extending up over the rings and thence downward between them, the lower ends of the bands being secured between two strips 19, at the lower ends of which strips is secured a weighing pan 20.

21 indicates a plate depending from the crossbar 10 and provided with a graduated reading scale, and 22 indicates a pointer secured to said strips 19. The reading scale is of course graduated and positioned on the plate 21 so that when there is no load upon the pan 20 the pointer 22 stands directly at "0", and so that the pointer will at all times indicate the exact pressure or weight upon the pan.

By this construction I have found that I can do away entirely with the necessity for using any high degree of accuracy in leveling the scale either in the course of its manufacture or when it is being set up ready for use. For example, in case the scale of Fig. 1 should be tilted slightly to the left at its upper end, the arm 13 would tend to assume a position at a slightly wider angle with the central longitudinal line of the plate 21 than it now occupies, tending to loosen the band 18 connected with such arm and thus somewhat decreasing the effectiveness of such arm in supporting the pan 20. At the same time the arm 14 would tend to stand at a wider angle from the vertical, thus increasing the effectiveness of such arm in supporting the pan 20. I have found that the increase in effectiveness of the arm 14 in such case will offset the decrease in effectiveness of the arm 13, the only change being that the arm 13 supports a smaller proportion of the weight of the pan while the arm 14 supports a correspondingly greater proportion of such weight. The effect is that with no load on the pan the pointer remains at "0" after the scale is tilted, and that accurate results in weighing can still be obtained.

By my invention I have provided a construction of scale which can be produced very cheaply, a construction that is free of springs or other parts liable to get out of order or to deteriorate with age or use, and a construction which though very simple is nevertheless very accurate and effective and which does not require any fine adjustments on account of being shifted from one point to another.

What I claim as my invention and desire to secure by Letters Patent is:—

1. The combination with a supporting plate, two weighted levers each of which comprises a ring at one end, a grooved supporting block for each lever, and a blade adapted to bear in said groove, said supporting block and said blade being carried one by said supporting plate and the other by said ring whereby each lever is adapted to swing freely on said supporting plate, of flexible connections extending over said rings and attached to said levers whereby a pull downward on said connections is adapted to raise said levers, a pan connected to the lower ends of said connections, and a graduated scale and a pointer, one of which is carried by said pan and the other of which is carried by said plate, adapted to indicate the force of the downward pull on said connections.

2. The combination with a supporting plate, two supporting blocks mounted thereon, each of said supporting blocks being provided with a groove in its upper face, and two weighted levers each comprising a ring at one end and a bearing blade projecting inward therefrom, said rings being adapted to be slipped over the free ends of said bearing blocks and said bearing blades being adapted to rest in said grooves, of flexible connections extending over said rings and attached to said levers whereby a pull downward on said connections is adapted to raise said levers, a pan connected to the lower ends of said connections, and a graduated scale and a pointer, one of which is carried by said pan and the other of which is carried by said plate, adapted to indicate the force of the downward pull on said connections, said blades being relatively much sharper than said grooves whereby said levers are adapted to swing to practically a horizontal position without the blades engaging the supporting blocks except in the bottoms of the grooves.

3. The combination of a supporting plate, two weighted levers each of which comprises a ring at one end pivotally mounted on said plate eccentrically of the ring, flexible connections extending over said rings and attached to said levers whereby a pull downward on said connections is adapted to raise said levers, and a pan connected to the lower ends of said connections.

4. The combination of a supporting plate, two supporting blocks mounted thereon, each of said supporting blocks being provided with a groove in its upper face, two weighted levers each comprising a ring at one end and a bearing blade projecting inward therefrom to a point above the center thereof, said rings being adapted to be slipped over the free ends of said bearing blocks and said bearing blades being adapted to rest in said grooves, flexible connections extending over said rings and attached to said levers whereby a downward pull on said connections is adapted to raise said levers, and a pan connected to the lower ends of said connections.

THEODORE C. PROUTY.

Witnesses:
ALBERT H. ADAMS,
WILLIAM H. DE BUSK.

Copies of this patent may be obtained for five cents each, by addressing the "Commissioner of Patents, Washington, D. C."